Oct. 9, 1923.    1,470,527
J. P. CAREY
HAIR GROWTH REMOVING IMPLEMENT FOR NOSTRILS AND EARS
Filed Feb. 27, 1922    2 Sheets-Sheet 1
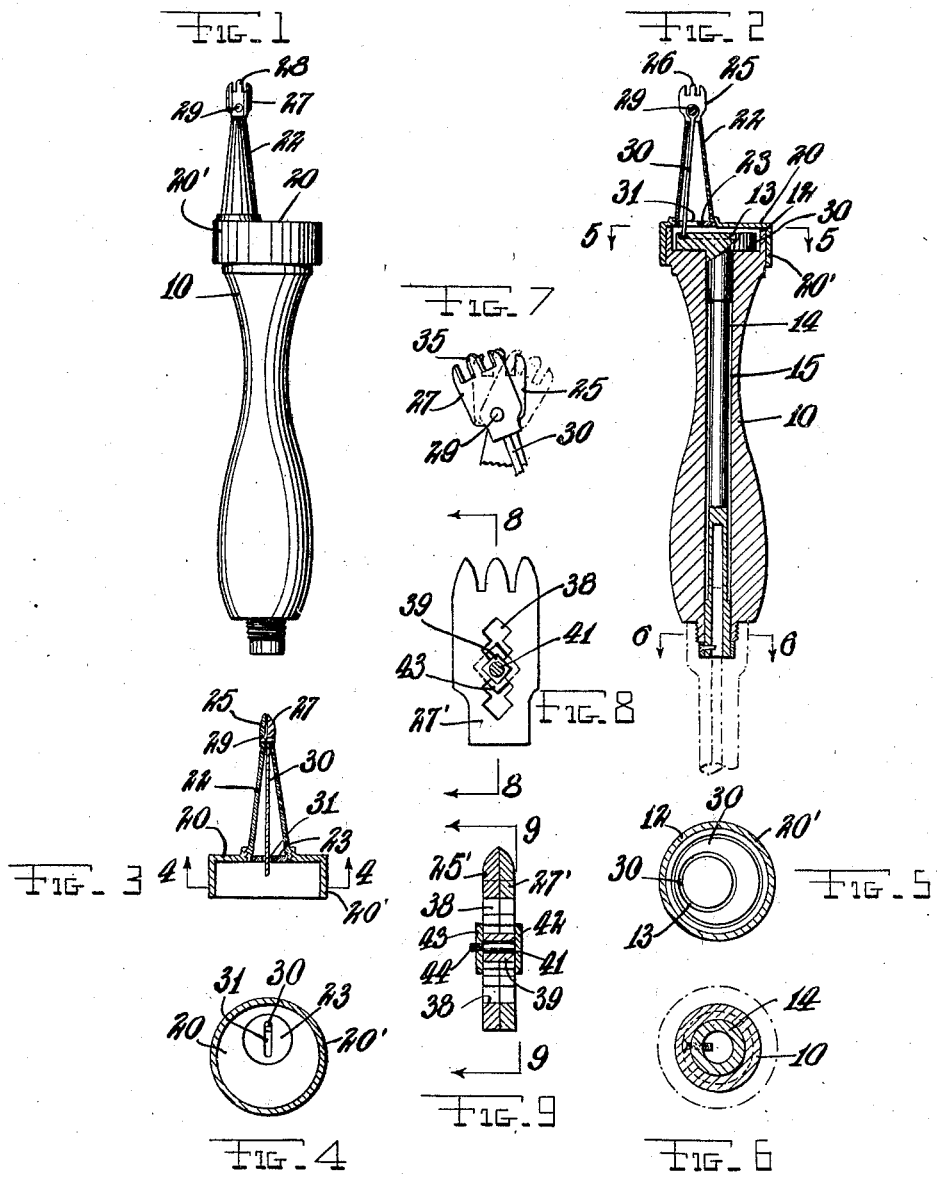
Inventor
James P. Carey
By Zoltan J. Polachek
Attorney

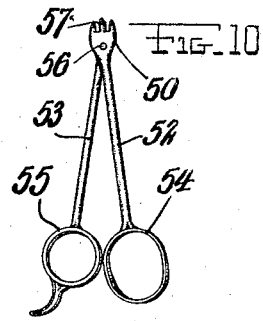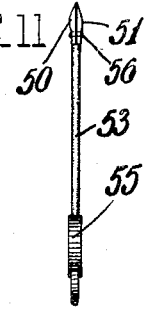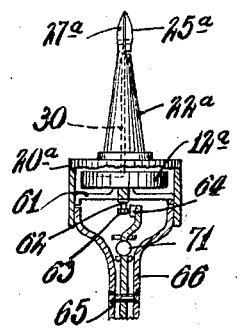

Patented Oct. 9, 1923.

1,470,527

UNITED STATES PATENT OFFICE.

JAMES P. CAREY, OF NEW YORK, N. Y.

HAIR-GROWTH-REMOVING IMPLEMENT FOR NOSTRILS AND EARS.

Application filed February 27, 1922. Serial No. 539,384.

*To all whom it may concern:*

Be it known that I, JAMES P. CAREY, citizen of the United States, residing at New York, in the county of New York and State of New York, have invented certain new and useful Improvements in Hair-Growth-Removing Implements for Nostrils and Ears, of which the following is a specification.

This invention relates generally to hair clipping devices, having more particular reference to a device adapted specially for use in removing undesirable hair growths in the ears or nostrils.

The invention has for its object to provide a novel and efficient implement of the above type capable of being readily introduced into the entrances of the nasal and aural passage and provided with a cutting device which will operate in the necessarily limited space without discomfort to the individual upon whom it is working.

For further comprehension of the invention, and of the objects and advantages thereof, reference will be had to the following description and accompanying drawings, and to the appended claims in which the various novel features of the invention are more particularly set forth.

Fig. 1 of the drawings is a side view of a hair cutting implement constructed according to my invention.

Fig. 2 is an axial sectional view thereof.

Fig. 3 is a vertical sectional view of the cutting element and its supporting cap removed from the implement, this view being taken at right angles to Fig. 2.

Fig. 4 is a horizontal section on the line 4—4 of Fig. 3.

Fig. 5 is a horizontal section taken on the line 5—5 of Fig. 2.

Fig. 6 is an enlarged horizontal section, taken on the line 6—6 of Fig. 2.

Fig. 7 is a fragmentary face view of modified cutters.

Fig. 8 is a fragmentary vertical sectional view showing a modification designed for adjustment of the stroke of the movable blade, this view being taken on the line 8—8 of Fig. 9.

Fig. 9 is a sectional view at right angles to Fig. 8, and taken on the line 9—9 thereof.

Fig. 10 is a side view showing the multiple-toothed blades as mounted on handles arranged for direct gripping by the operator.

Fig. 11 is an edge view thereof.

Fig. 12 is a side view, with parts broken away, showing a cutting head as in Figs. 1 and 2 arranged for manual operation.

Fig. 13 is a transverse sectional view thereof, taken on the line 13—13 of Fig. 1.

Fig. 14 is a similar view to Fig. 12 but showing a further modification.

As here embodied my improved hair clipping device comprises a main body 10 suitably shaped to be grasped in the hand and which will be therefore referred to as the handle. In the forward end of the handle a shallow flat bottomed recess 11 of circular outline is formed, and in this recess is located a disk 12 having an eccentrically disposed annular groove 13 in its outer face. This disk is fixed on the forward end of a spindle 14 journaled in the handle and extending rearwardly through an axial passage 15 in the latter. This spindle is held against axial displacement by a collar 15 fixed to the rear end thereof by a screw 16. The spindle is formed with a socket 17 into which projects the end of a flexible shaft 18 of ordinary construction such as used in dental machines, and which may be secured thereto in a well known manner.

Mounted on the forward end of the handle 10 and covering the recess 11 in which is the disk 12, is a flanged cap 20 the flange 20' whereof engages over the circumferential wall of the handle and is held thereon by frictional engagement.

Projecting forwardly from the cap is a hollow conical extension 22 which extends parallel to the spindle 14 but eccentric thereto, the lower end of this extension having a fixed disk 23 extending thereacross. The extension 22 may be fixed in the cap 20 in any suitable manner.

Formed on, and projecting forwardly from, the extension 22 is a fixed cutter blade 25 whose inner, or operative, face ties substantially in a plane radial to the axis of spindle 14, and which is provided with cutting teeth 26. Co-operating with this blade 25 is a movable blade 27 having teeth 28 and which is pivoted to a stud 29 fixed in the base of the blade. Fixed to the blade 27, and projecting inwardly through the hollow extension 22, is an arm 30 whose inner end engages in the eccentric groove 13 in the disk 12. This arm extends through a slot 31 in the member 23 extending radial to the spindle 14, the walls of this slot forming a guide for the inner end of the arm, eccentrically grooved disk comprising broadly a cam element.

It is believed that the manner of operation of my improved hair clipping device will be readily understood from the above description, the engagement of the arm 30 with the eccentric groove in disk 12 causing the movable blade 27 to be oscillated when disk 12 is rotated, as will be apparent.

As indicated in Fig. 7 I may provide the cutting blades with teeth 35 which are sharpened on both sides so as to operate in both directions.

In Figs. 8 and 9 I have shown a means for adjusting the fulcrum of the pivoted blade, indicated here by the reference character 27', on the fixed blade 25'. In this arrangement each blade is formed with a slot 38 having correspondingly notched or serrated side walls. Located in the respective slots are square bushing 39. Through this bushing passes freely a bolt 41 having an enlarged head 42 engaging over the blade 27', and a nut 43 screwed on its diminished end 44. As will be apparent, by adjusting the bushing 39 to engage in different notches in the slots 38 the fulcrum of the blade 27', and in consequence the degree of movement thereof on blade 25' may be varied.

In the embodiment of the invention shown in Figs. 10 and 11 I mount a pair of cutting blades 50 and 51, similar to the blades 25 and 27, upon handles 52 and 53 which are provided at their outer ends with thumb and finger grips 54 and 55, the blades being pivoted together as at 56, this pivot point having the same relation to the multiple-teeth 57 of the blades as the pivot 29 of the blades 25 and 27 has to the teeth thereof.

In Figs. 12 and 13 I show a modification in which the movable blade is operated by an arm engaging a grooved disk as in Figs. 1 and 2 but the disk is adapted for manual rotation. In this construction I provide a cap 20ª corresponding to the cap 20 and having projecting therefrom an extension 22ª carrying a fixed blade 25ª and a movable blade 27ª operated by an arm 30ª engaging in a groove 13ª in a disk 12ª located in the cap, these parts as so far described being similar to the corresponding parts shown in Figs. 1 and 2. In the present instance the flange of the cap is extended to form a casing 60 across which extends a spider 61 which supports the disk 12ª. The disk is fixed on a trunnion 62 which extends through the spider and has fixed thereon a gear pinion 63 meshing with a gear segment 64. This segment 64 is fulcrumed on a stud 65 fixed in an interior casing element 66 engaging in the flange 60. This interior casing element has an integral handle extension 67 provided with a thumb grip 68, while the gear segment 64 is formed integral with a handle 69 provided with a finger grip 70, the handle 69 projecting through a suitable slot in the casing element 66. A coiled tension spring 71, connected at one end to the casing element 66 and at its opposite end to the segment 64, normally urges the handles 67 and 69 apart.

In Fig. 14 I have indicated a further extension of this modification in which the pinion 63 is engaged by a gear 75 to which is eccentrically connected a link 76 connected also to a bell crank extension 77 from a movable handle 78 which is pivoted as at 79 in a supporting casing indicated at 80 the casing 80 being fixed on a handle 81. With this latter arrangement a constant rotation of the disk in one direction is obtained.

Having thus described my invention what I claim as new and desire to protect by Letters Patent of the United States is as follows:

1. A device of the class described comprising a supporting body, a hollow diminished extension therefrom, a fixed blade and an oscillatory blade carried on the outer end of said extension, and an arm extending from said oscillatory blade through said extension for oscillating said blade, and a member carried by said supporting body for oscillating said arm, said member comprising a disk having an eccentric groove in its face engaged by said arm, and a guide element in the inner end of said extension for said arm, said guide element comprising a disk having a slot therein extending radially with respect to said first disk.

2. A device of the class described comprising a handle, a rotary drive element carried thereby, a hollow member extending forward from said handle eccentric to said rotary drive element, a fixed blade on said hollow member, an oscillatory blade, and an operative connection extending through said hollow member from said rotary drive member to said oscillatory blade, said rotary drive member comprising a disk having an eccentric groove in the face thereof, and said operative connection comprising an arm fixed to said oscillatory blade and engaging in said groove, and a guide member for said arm adjacent said disk.

3. A device of the class described comprising a handle, a rotary drive element carried thereby, a hollow member extending forward from said handle eccentric to said rotary drive element, a fixed blade on said hollow member, an oscillatory blade, and an operative connection extending through said hollow member from said rotary drive member to said oscillatory blade, said rotary drive member comprising a disk having an eccentric groove in the face thereof, and said operative connection comprising an arm fixed to said oscillatory blade and engaging in said groove, and a guide member for said arm adjacent said disk, said guide member comprising a second disk in the rear end of said hollow member and having a slot therein radial with respect to said first disk.

4. A device of the class described comprising a handle having a recess in one end, a spindle extending through said handle, a disk on said spindle located in said recess and having an eccentric groove in its face, a cap on said handle covering said disk, a hollow conical extension projecting forwardly from said cap eccentric to said disk, a second disk in the inner end of said extension having a slot therein extending radially with respect to said first disk, a fixed blade on the end of said extension, an oscillatory blade pivoted to said fixed blade, and an arm fixed to said oscillatory blade and extending through said slot and into said groove.

5. A device of the class described comprising a handle having a recess in one end, a spindle extending through said handle, a disk on said spindle located in said recess and having an eccentric groove in its face, a cap on said handle covering said disk, a hollow conical extension projecting forwardly from said cap eccentric to said disk, a second disk in the inner end of said extension having a slot therein extending radially with respect to said first disk, a fixed blade on the end of said extension, an oscillatory blade pivoted to said fixed blade, and an arm fixed to said oscillatory blade and extending through said slot and into said groove, and a drive shaft connected to said spindle.

6. A device of the class described comprising a supporting body, a diminished extension therefrom, and cutting elements including an oscillatory blade carried by said extension, and means for adjusting the pivot point of said oscillatory blade.

7. In a device of the class described, a fixed blade and an oscillatory blade having slots therein formed with serrated side walls, and a fulcrum element for said oscillatory blade including members adapted to engage in the serrations in said side walls.

In testimony whereof I have affixed my signature.

JAMES P. CAREY.